United States Patent
Lawrence

[11] Patent Number: 5,850,661
[45] Date of Patent: Dec. 22, 1998

[54] DEVICE FOR CLEANING COMPUTER MOUSE BALL

[76] Inventor: Arthur V. Lawrence, 13620 Redwood Hwy., Wilderville, Oreg. 97543

[21] Appl. No.: 754,937

[22] Filed: Nov. 25, 1996

[51] Int. Cl.[6] .............................. A63B 47/04; A47L 25/00
[52] U.S. Cl. ...................................... 15/210.1; 15/257.01
[58] Field of Search ............... 15/1, 21.2, 210.1, 15/257.01, 268; 294/19.2

[56] References Cited

U.S. PATENT DOCUMENTS

| | | | |
|---|---|---|---|
| 1,758,011 | 5/1930 | Reach | 15/21.2 |
| 3,098,252 | 7/1963 | Sundquist | 15/104.94 |
| 3,806,983 | 4/1974 | Cunningham et al. | 15/160 |
| 4,084,287 | 4/1978 | Ingram et al. | 15/210.1 |
| 4,683,603 | 8/1987 | Purlia et al. | 15/104.94 |
| 4,750,232 | 6/1988 | Doney | 15/210.1 X |
| 4,760,618 | 8/1988 | Chapin, Jr. | 15/104.93 |
| 5,339,486 | 8/1994 | Persic, Jr. | 15/244.1 |
| 5,358,766 | 10/1994 | Field | 428/77 |
| 5,409,107 | 4/1995 | Browne | 206/305 |
| 5,418,999 | 5/1995 | Smith | 15/106 |
| 5,436,616 | 7/1995 | Futatsugi et al. | 340/635 |

*Primary Examiner*—Mark Spisich
*Attorney, Agent, or Firm*—Jacobson, Price, Holman & Stern, PLLC

[57] ABSTRACT

A computer mouse ball cleaner generally having a tong-like shape with two elongated parallel prongs that are affixed together at a handle end is made of rigid plastic. Each prong has a circular opening that is about the size of the conventional mouse ball and the openings are in registry. The mouse ball is placed between folds of a cleaning cloth and positioned within the openings of the cleaner. The user then pulls on the cleaner, while retaining the cleaning cloth. Accordingly, as the user pulls on the cloth, the ball is retained within the openings so that the cloth rubs over the ball. The rubbing action operates to clean the surface of the ball.

16 Claims, 1 Drawing Sheet

DEVICE FOR CLEANING COMPUTER MOUSE BALL

FIELD OF THE INVENTION

The present invention relates to a device used for cleaning small spherical objects. More particularly, the present invention relates to a tong-shaped device for use in cleaning small spherical objects, especially computer mouse balls, in conjunction with a cleaning cloth or the like.

DESCRIPTION OF THE RELATED ART

Computer mouses generally permit a computer user to more easily control the operation of a computer by quickly moving a mouse-guided cursor about the computer screen. These computer mouses typically comprise a housing having a computer mouse ball protruding from the bottom of the housing. The user moves the computer housing about a flat working surface, such as the surface of a desk or a mouse pad. As the mouse is moved, the ball rolls along the working surface. Components within the mouse then track the movement of the mouse ball and relate the movement to a direction on the computer screen. The mouse is interfaced with the computer and the cursor is positioned in accordance with the movement of the mouse.

Mouse balls are usually constructed of a rubber coated metal. As the mouse is used, the mouse ball tends to collect grime and dirt from the surface on which it is operated. As a result, the soiled mouse ball reduces the efficiency and accuracy of the system. The contaminated mouse ball may further lead to interference with components located within the mouse housing.

Consequently, mouse balls periodically need to be cleaned. U.S. Pat. No. 4,358,766 shows a mat having a tacky surface that is used to clean the mouse ball. In order to clean the ball, the user passes the ball over the tacky surface of the mat. However, the mat is not highly effective since the mat itself is subject to collecting dirt and grime.

Devices have also been developed for cleaning small rounded objects, especially golf balls. Several golf ball cleaners are shown, for instance, by U.S. Pat. Nos. 5,339,486, 4,084,287, 3,806,983, and 3,098,252. These systems generally entail placing the golf ball in a chamber having a means which is then used to scrub the ball. However, these devices are generally difficult to use and are not suitable for use in cleaning a mouse ball.

SUMMARY OF THE INVENTION

The mouse ball cleaner of the present invention generally comprises a substantially rigid tong like device having two longitudinally extending and substantially parallel support arms or prongs that are affixed together at one end. Each arm or prong has a circular opening near its unattached end that is slightly larger than the size of a conventional mouse ball. The longitudinally extending, substantially parallel support arms are spaced from each other a short distance, preferably substantially less than the radius of the mouse ball to be cleaned, and the openings in each arm are in substantial registry. The mouse ball is placed between two folds of a cleaning cloth and then positioned within the openings of the cleaner by spreading the arms or prongs a sufficient distance to receive the mouse ball and cleaning cloth between the openings. As such, the cleaner entraps the ball within the opposed folds of the cloth in the aligned openings in the arms.

The user can then pull downwardly on the cleaner, while holding the cleaning cloth firm. As the user pulls on the cleaner, the ball is retained within the openings so that the cloth rubs against the ball as the ball is pulled downwardly entrapped in the openings of the cleaner. As needed, the cleaner can be rotated approximately 180° and pulled downwardly again with respect to the cloth. The rubbing action of the ball moving within the folds of the cloth operates to effectively clean the surface of the ball.

Accordingly, it is an object of the present invention to provide a device for use in effectively cleaning small spherical objects, especially computer mouse balls.

It is another object of the present invention to provide a computer mouse ball cleaner to be used in conjunction with a conventional cleaning cloth to facilitate and improve the ball cleaning.

It is a further object of the invention to design a computer mouse ball cleaner in accordance with the preceding objects which is simplistic in design, requires no moving parts and which can be easily manufactured from known and readily available components.

It is yet another object of the present invention to provide a method for simply and efficiently cleaning computer mouse balls and the like using a conventional cleaning cloth.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
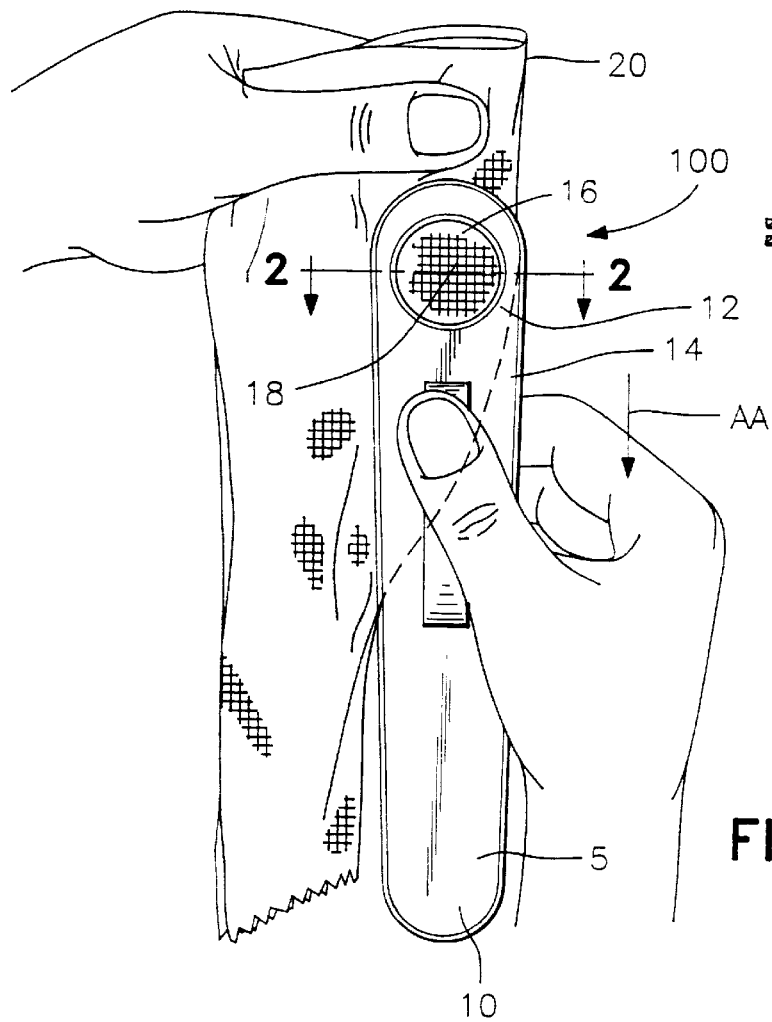
FIG. 1 shows a device for cleaning computer mouse balls in accordance with the preferred embodiment of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Turning to the drawings, FIG. 1 shows the mouse ball cleaner 100 of the present invention. Essentially, the cleaner 100 comprises an elongated body 5 having a yoke or fixed end 10 forming a handle, and an opposite free receiving end 12 that divides into two generally parallel longitudinally extending arms or prongs 14, thereby forming a tong shape. Each of the arms 14 has a round opening 16 located toward the receiving end 12. The openings 16 are aligned with each other so as to receive and hold a small spherical object therebetween.

In order to operate the mouse ball cleaner 100, a mouse ball 18 is first wrapped in opposed folds of a cleaning cloth 20, such as any standard cleaning cloth. The arms 14 are then spread apart, and the wrapped ball 18 is positioned between arms 14 and within openings 16. The user then pulls the cleaner body 5 in a downwardly direction, as shown by arrow AA in FIG. 1, while holding the cloth 20 firm. Since the mouse ball 18 is entrapped in the folds of cloth 20 as a result of being held in openings 16, the ball 18 will also move downwardly in combination with cleaner body 5. As the mouse ball 18 moves downwardly, with respect to cloth 20, the cloth 20 rubs against the ball surface thus cleaning off the dirt and grime that may be located on the surface of ball 18.

Figure 2:
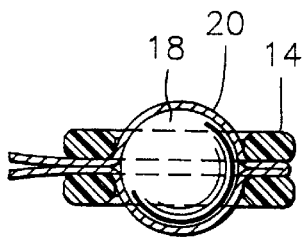
FIG. 2 shows a cross-section of the mouse ball cleaner taken along line 2—2 of FIG. 1.

Referring now to FIG. 2, the openings 16 are selected so that cloth 20 will drag over the entire surface of ball 18. Thus, any dirt on ball 18 will be transferred to cloth 20. In the preferred embodiment, openings 16 are approximately $15/16$ of an inch in diameter. The openings 16 are preferably designed to be slightly larger than the size of the standard mouse ball 18, which typically has a diameter of about 0.85 of an inch, in order to accommodate standard cloth 20, which typically has a thickness of about 0.002–0.004 inches. However, the cleaner 100 may be used to clean spherical objects of all sizes smaller than opening 16. In addition, the size of the openings 16 are not limited by the preferred dimensions. Accordingly, openings 16 may vary significantly in size and shape, although a substantially circular opening is clearly preferred.

Figure 3:
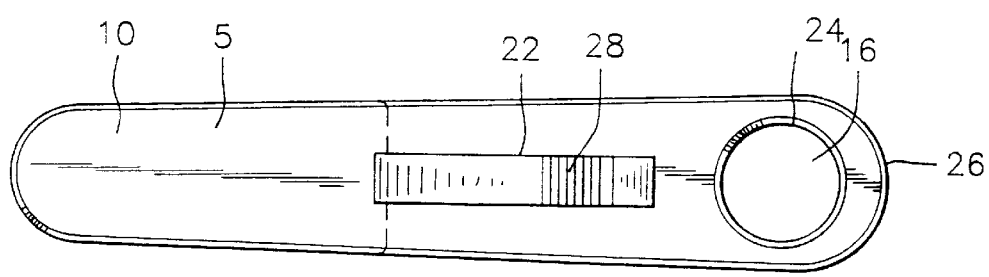
FIG. 3 is a top view of the mouse ball cleaner shown in FIG. 1.

As shown in FIG. 3, the top and bottom edges of openings 16, as well as the outer periphery of the cleaner body 5, are preferably beveled or rounded to form generally smooth edges 24 and 26, respectively. The cleaner body 5 is generally formed in the shape of an elongated oval, with the handle end 10 preferably being slightly tapered. A thumb rest 22 is optionally provided centrally about one side of the body 5. The thumb rest 22 allows the user to have greater leverage in holding the cleaner 5 as the cleaner is being pulled with respect to the cloth 20. Alternatively, the cloth 20 can be pulled through cleaner 5 in any desired direction. The thumb rest 22 preferably has a grooved surface to provide a better grip for the user.

In the preferred embodiment, the receiving end 12 is about 1¼ inches wide, and the fixed end is about 1 inch wide. The entire body 5 is approximately 6¼ inches long. Opening 16 is located approximately $9/32$ of an inch from the outer edge of the receiving end 12 and about $9/32$ of an inch from the sides of body 5. Thumb rest 22 is preferably affixed to cleaner 5 by an epoxy.

The body 5 can be made of any suitably hard plastic material, preferably a clear type plastic such as "Plexiglas", having sufficient resiliency so that prongs 14 may be separated to allow the ball 18 within cloth 20 to be placed into openings 16 and then recover to their original position. The cloth 20 is preferably a standard rayon or silk fabric, but may be of any suitable material or may have a tacky surface layer, such as a soft polyurethane or a synthetic rubber.

Figure 4:
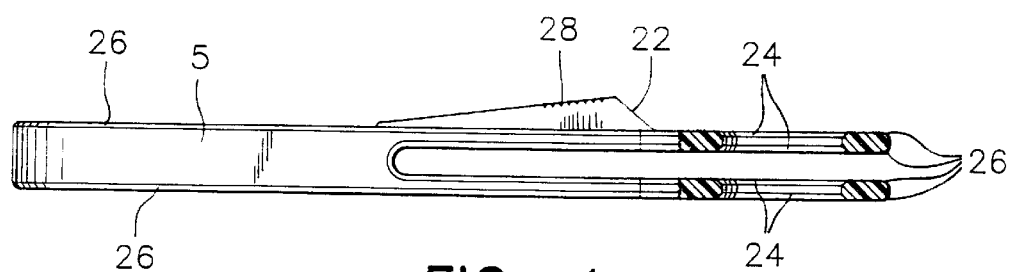
FIG. 4 is a partially cut side view of the mouse ball cleaner of FIG. 1.

Turning now to FIG. 4, the thumb rest 22 is shown as being elongated and having a slight incline and a grooved surface 28. Preferably, the elevated end of the thumb rest 22 is toward the prong or receiving end 12 of the cleaner 5. However, the thumb rest 22 may be configured in any suitable shape and size, and preferably is sloped to accommodate either right- or left-handed users. As further shown in FIG. 4, the cleaner 5 is preferably molded from a single piece of plastic material. The fixed end 10 generally extends about 2⅞ inches, whereas the receiving end 12 is about 5 inches in length. Prongs 14 are spaced about ¼ inch apart, and each prong 14 is about ⅛ inch thick.

Accordingly, as shown in FIG. 2, the mouse ball 18, as encased in cloth 20, protrudes from openings 16 to beyond either side of cleaner body 5. However, the cleaner body 5 may be of any suitable thickness, such as having a dimension sufficient to prevent mouse ball 18 from protruding beyond the outer surface of the cleaner 5. In addition, the cleaner 5 may be configured with an enclosure (not shown) over the outside of openings 16 so that the mouse ball 18 does not fall out when the cloth is fully removed from between prongs 14.

In an alternative embodiment, the cleaner 5 may be configured from four pieces of ⅛ inch thick plastic, such as "Plexiglas", including an elongated top plate, two middle sections and an elongated bottom plate matching the top plate. The middle sections form the yoke to create the spacing between prongs 14 formed by the top and bottom plates. The four pieces are suitably secured together by any conventional fastening system, such as nuts and bolts, or an adhesive such as epoxy, either singly or together.

In operation, the mouse ball 18 is first removed from the mouse housing (not shown). Mouse housings have been designed so that the mouse balls are easily removed for replacement and to ease repair of the mouse. Typically, the mouse ball is merely retained within the mouse housing by a twist-off plate. Thus, the plate is simply twisted off, and the ball falls free.

Once the mouse ball 18 is removed from its housing, it is placed in the center of cleaning cloth 20 that is then preferably folded a single time to enclose the ball 18. Optionally, the ball 18 can first be sprayed with a cleaning solution, if desired. The prongs 14 of cleaner 5 are then separated and the combined ball 18 and cloth 20 are positioned so that the ball 18 is within opening 16. The cleaner 5 is then pulled downwardly as shown in FIG. 1, while the cloth 20 is held tight.

Preferably, the ball 18 is located toward one end of the cloth 20, and the cleaner 5 is held along the direction of movement. However, the cleaner 5 may be held at any position with respect to cloth 20, such as sideways or in an inverted position. In addition, the cloth 20 may be folded more than once before or after the ball is positioned within the cloth. Likewise, only one flap of the cloth may be pulled to provide additional friction between ball 18 and cloth 20. Still yet, instead of pulling on the cleaner body 5 and holding the cloth 20 steady, the user may opt to pull the cloth 20 and retain the cleaner 5 in a fixed position.

Once the ball 18 is cleaned, it may then be removed by pulling on cloth 20 or cleaner body 5 until the cloth is fully withdrawn from cleaner body 5. The ball 18 will then fall free from cleaner 5. Thus, the user must position the cleaner body 5 over a surface or otherwise capture the ball 18 as it falls from between openings 16. Alternatively, however, the user may decide to spread prongs 14 apart and remove the ball 18 while it is still wrapped in cloth 20. The cleaning cloth 20 may then be unfolded and the ball 18 removed. The ball 18 may then be repositioned within the mouse.

Spherical objects, and especially objects that are significantly smaller than opening 16, may tend to sag or hang within a loose cloth 20. To remedy this sag effect, the user may tension the cloth 20 in the cleaner body 5 and squeeze the prongs 14 together as the cleaner 5 is being drawn so that the cloth 20 rubs harder against ball 18. In this manner, the cloth 20 will be taut between openings 16 so that ball 18 does not hang.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. For example, openings 16 may be of any suitable shape and size to accommodate different objects, such as a golf ball. Therefore, it is not desired to limit the invention to the specific examples disclosed or the exact construction and operation shown and described. Rather, all suitable modifications and equivalents may be resorted to, falling within the scope of the invention.

I claim:

1. A device for cleaning a generally spherical object with a cleaning cloth comprising:

a cleaning cloth for enclosing the object;

a cleaner body having a fixed end affixing two prongs; and, an opening located in each of the prongs for receiving the enclosed object, wherein the enclosed object is positioned in said openings and the cleaning cloth is drawn through said openings to clean the object.

2. The device of claim 1, wherein the cleaner body and the two prongs are elongated to form the general shape of a tong.

3. The device of claim 1, wherein the prong openings retain the ball as the cleaning cloth is drawn.

4. The device of claim 1, wherein said object is a computer mouse ball.

5. The device of claim 1, wherein said prongs are elongated flat arms substantially parallel to each other.

6. The device of claim 5, wherein said openings have substantially the same shape and are substantially in registry with respect to each other.

7. The device of claim 6, wherein said openings are substantially circular.

8. The device of claim 1, wherein a substantial portion of said generally spherical object extends through each opening beyond an inner surface of each prong.

9. A device for cleaning a ball shaped object with a standard cleaning cloth which comprises a rigid plastic body having a fixed end affixing two substantially parallel spaced apart arms, each arm having a substantially circular opening in registry with each other and a diameter slightly larger than the largest diameter of said ball shaped object, said arms being of sufficient length to allow them to be spread apart sufficiently to allow said ball shaped object folded in said cleaning cloth to pass therebetween and be received in said registered openings for cleaning said object by moving said device with respect to said cloth while retaining said ball within said openings.

10. The device of claim 9, wherein said substantially parallel arms are spaced from each other a distance substantially less than the radius of said object to be cleaned.

11. The device of claim 10, wherein a substantial portion of the ball shaped object extends through the opening of each arm beyond an inner surface of each arm.

12. The device of claim 9, wherein said arms are substantially flat plates.

13. The device of claim 9, wherein said body is molded of moldable plastic.

14. The device of claim 9, wherein said body comprises upper and lower elongated substantially flat plates having said arms at one end thereof and at least one short intermediate section separating said plates at said fixed end, said plates and said short section affixed to each other at said fixed end.

15. A device for cleaning a generally spherical ball comprising:

a cleaning cloth for enclosing the ball; and a cleaner having a cleaner body with a yoke end affixing two generally parallel prongs, each prong having an opening for receiving the enclosed ball and for retaining the ball within the prongs as the cleaner is moved with respect to the cloth so that the cloth draws across the ball.

16. The device of claim 15, wherein the cleaner body and the prongs are elongated to form the shape of a tong.

* * * * *